(No Model.) 2 Sheets—Sheet 1.

G. BRAMMAR & J. R. SWARTS.
DEVICE FOR FORMING SHOULDERS UPON VEHICLE AXLES.

No. 258,279. Patented May 23, 1882.

Witnesses
Geo. H. Strong.
Frank A. Brooks

Inventors
George Brammar
and
Jacob R. Swarts
By Dewey & Co. Attys.

(No Model.) 2 Sheets—Sheet 2.
G. BRAMMAR & J. R. SWARTS.
DEVICE FOR FORMING SHOULDERS UPON VEHICLE AXLES.
No. 258,279. Patented May 23, 1882.
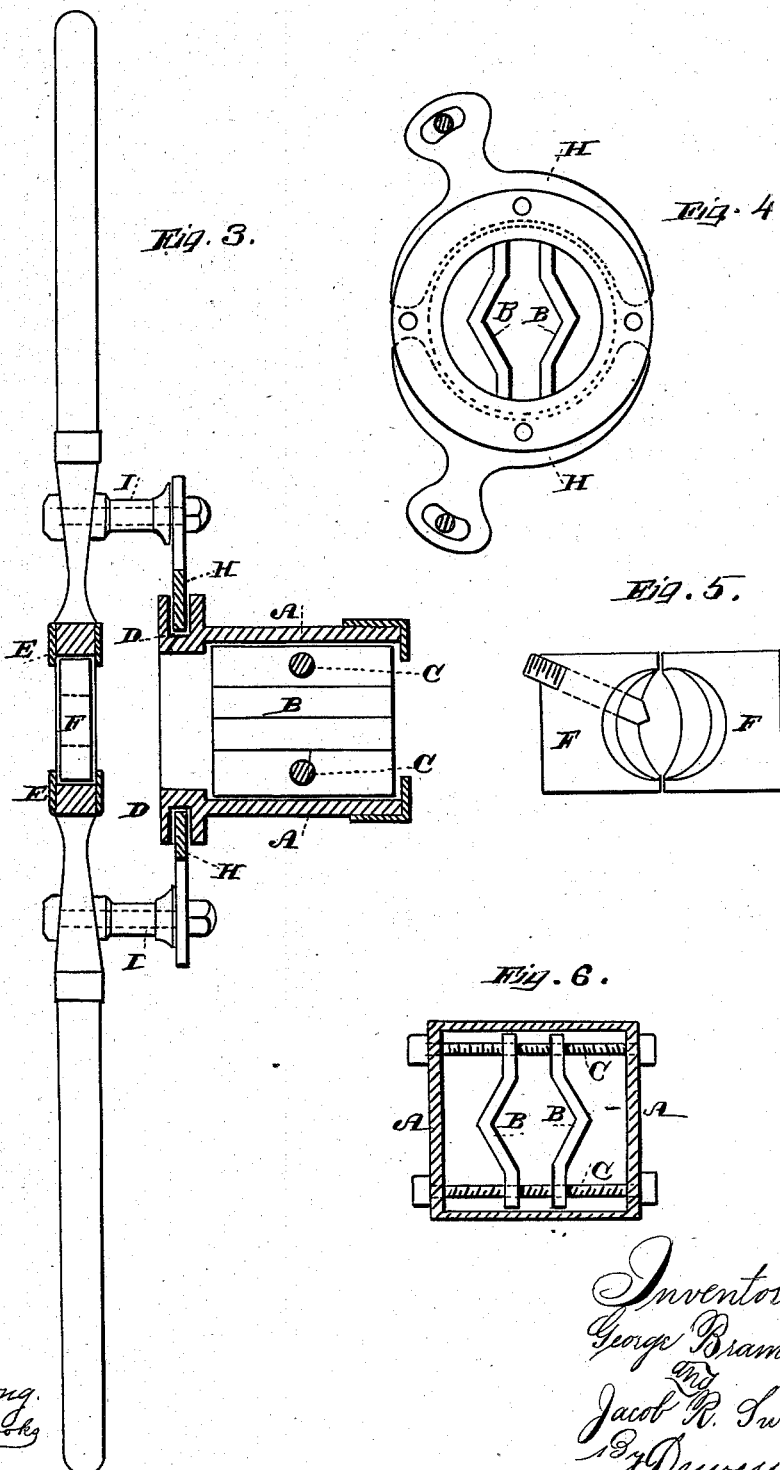
Witnesses
Geo. H. Strong.
Frank A. Brooks
Inventors
George Brammar
and
Jacob R. Swarts
By Dewey & Co. Attys

UNITED STATES PATENT OFFICE.

GEORGE BRAMMAR AND JACOB R. SWARTS, OF LIVERMORE, CALIFORNIA.

DEVICE FOR FORMING SHOULDERS UPON VEHICLE-AXLES.

SPECIFICATION forming part of Letters Patent No. 258,279, dated May 23, 1882.

Application filed December 3, 1881. (No model.)

*To all whom it may concern:*

Be it known that we, GEORGE BRAMMAR and JACOB R. SWARTS, of Livermore, county of Alameda, State of California, have invented a Tool for Shouldering Iron Bars or Axles; and we hereby declare the following to be a full, clear, and exact description thereof.

Our invention relates to an apparatus for cutting off or forming a shoulder upon iron bars, or the ends of the axles of vehicles when the wheel-boxes have become too short for the length of the spindle, and for other similar work.

It consists of a clamp or sleeve having suitable centering and holding screws, the sleeve having a groove around its periphery to receive curved encircling arms, by which a tool-holder is supported and guided while being turned around, so that the tool will make a cut at the desired point and form a corresponding shoulder.

Figure 1:
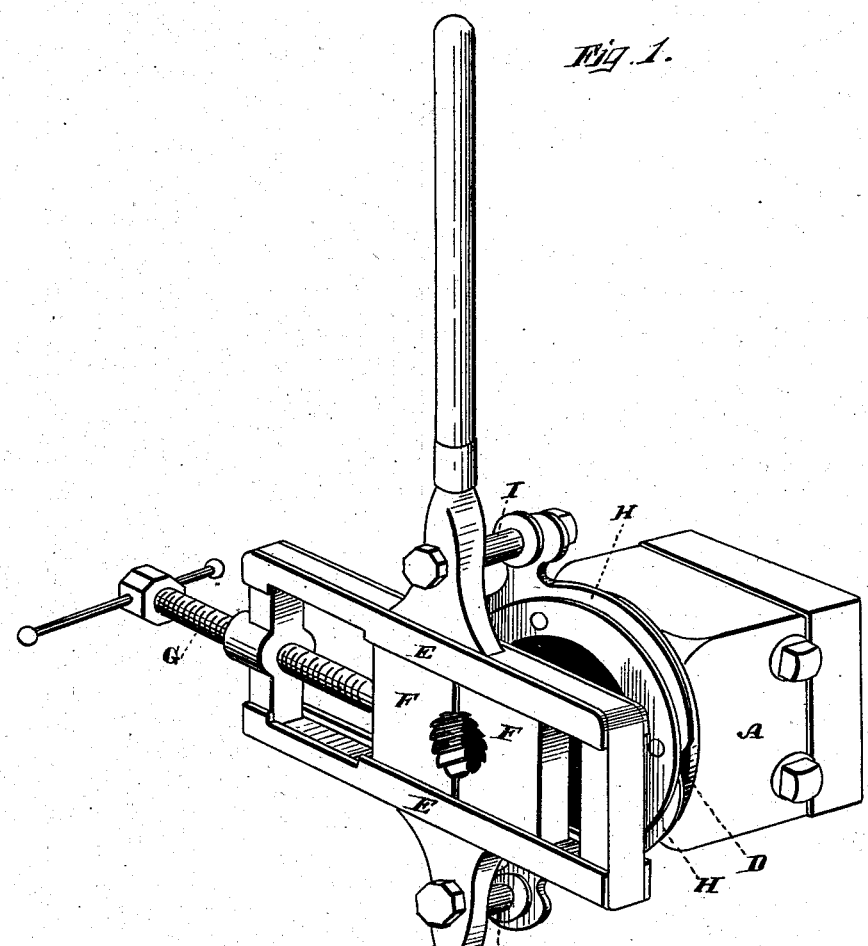
Figure 2:
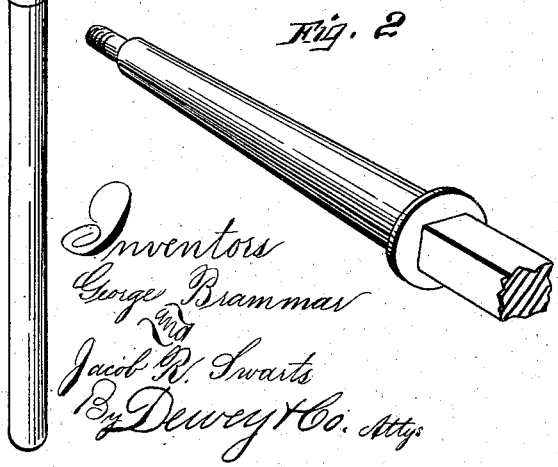

Referring to the accompanying drawings, Figure 1 is a perspective view. Fig. 2 is a view of an axle with the shoulders formed. Fig. 3 is a section. Figs. 4, 5, and 6 are details of construction.

A is a case of any suitable shape, having within it the clamping-jaws B, which will fit over any axle or bar of iron upon which it is desired to form the shoulder. Through the ends of these jaws holes are made and screw-threads are cut to receive the right and left threaded screws C, the heads of which project outside the case, so that they may be turned by a wrench or spanner, and the device thus secured firmly to the axle or other bar. One end of the case A has a circular disk or plate fixed to or formed in its edge, as shown.

The tool or cutter holder E may be of any ordinary or convenient form to receive cutting dies or tools F, which may be moved forward or adjusted for the cut by a screw, G. Two curved or crescent-shaped arms, H, fit into the deep groove D, clasping it from opposite sides, as shown. These arms have posts I extending from a point midway in their length to the handles or arms of the cutter-holder E, where they are secured, so that the cutter, with its holder, may be moved around the axle or bar, being supported from the case A by the curved arms H, so as to move around the spindle, which is the common center.

This device is especially useful for forming new shoulders upon the ends of the spindles of vehicle-axles. When by use the wheel-boxes have worn too short the nut upon the end of the axle cannot be turned up close enough to hold the wheel properly. It then becomes necessary to turn off a portion of the end of the spindle and form a new shoulder at the inner end of the smaller threaded portion. This is difficult to do, and our apparatus is adapted for this work. When the wheel has been removed the clamps in the case A are secured to the spindle at such a point that the cutters F will act upon the spindle at the point previously marked. As the case is centered by turning up the screws and fixing it upon the spindle, it is only necessary to turn the tool-holder around with the guides H, running in the channel D, and feed the tool forward until the spindle has been cut down to the size of the threaded outer portion for the desired length. By the use of a screw-plate the thread is then cut up to the shoulder, so that the nut can be turned up to that point, and thus fit against the box when the wheel is in position. This shortening of the running portion of the spindle necessitates cutting off the outer end of the threaded portion, so that it will not project beyond the nut and make an unsightly appearance. The device is therefore fixed upon the axle at a point which will allow the cutter to take off the end of the spindle wherever needed.

By this device we are able to cut down or form a shoulder upon the end of the axle and to cut off the extreme end after the wheel has been removed without in any way straining the spindle, and without other apparatus.

Whenever the inner or back collar becomes worn it can be turned up by simply reversing the apparatus, so that the cutter can be applied to this collar, the operation being similar to that described for the outer shoulder.

We do not claim broadly a device for cutting off rods having rotary cutters and a base which may be clamped to the rod, as we are aware that such devices have been used.

Having thus described our invention, what we claim as new, and desire to secure by Letters Patent, is—

A device for forming shoulders upon vehicle-axles, consisting of a case, A, having clamps by which it may be secured to the axle, a grooved periphery, as shown, and a tool-holder, E, in combination with the crescent-shaped arms H, fitting into the groove D, and the posts I, projecting in a line parallel with the spindle, and adapted to support the tool-holder so that it operates at a distance from the case, substantially as herein described.

In witness whereof we have hereunto set our hands.

GEORGE BRAMMAR.
JACOB R. SWARTS.

Witnesses:
S. H. NOURSE,
FRANK A. BROOKS.